(12) United States Patent
Menard

(10) Patent No.: US 6,764,137 B2
(45) Date of Patent: Jul. 20, 2004

(54) AIRCRAFT SEAT WITH ADJUSTABLE LEGREST AND FOOTREST

(75) Inventor: François Menard, Issoudon (FR)

(73) Assignee: Societe Industrielle et Commerciale de Materiel Aeronautique, Issoudun (FR)

(*) Notice: Subject to any disclaimer, the term of this patent is extended or adjusted under 35 U.S.C. 154(b) by 0 days.

(21) Appl. No.: 09/892,507

(22) Filed: Jun. 28, 2001

(65) Prior Publication Data

US 2002/0003370 A1 Jan. 10, 2002

(30) Foreign Application Priority Data

Jul. 5, 2000 (FR) .............................................. 00 08766

(51) Int. Cl.[7] .............................................. A47C 20/04
(52) U.S. Cl. ............................ 297/423.36; 297/423.26; 297/423.3; 297/423.34
(58) Field of Search ....................... 297/423.36, 423.34, 297/423.3, 423.28, 423.26

(56) References Cited

U.S. PATENT DOCUMENTS 5,352,020 A    10/1994   Wade et al. ........... 297/423.26
5,651,587 A  * 7/1997   Kodaverdian .......... 297/423.36
5,887,949 A    3/1999   Kodaverdian .......... 297/423.36
6,267,445 B1 * 7/2001   Marais .................. 297/423.36
2002/0109390 A1 * 8/2002 Hagiike ................. 297/423.36

FOREIGN PATENT DOCUMENTS

| EP | 0 869 061 A2 | 7/1998 |
| EP | 0 869 061 A3 | 3/1999 |
| EP | 0 774 913 B1 | 7/1999 |
| WO | WO 97/42050 | 11/1997 |

* cited by examiner

Primary Examiner—Rodney B. White
(74) Attorney, Agent, or Firm—Blank Rome LLP

(57) ABSTRACT

A seat (1), notably for an aircraft, comprising a squab (2), a backrest (3), and a legrest (4) fixed in an articulated fashion to the structure of the seat so as to be able to adjust its inclination between a substantially vertical position (B) and a position (A) situated substantially in line with the squab, this legrest (4) carrying a footrest (5) able to move between a retracted position and an extension position situated in line with the legrest. The seat (1) comprises control means (6) consisting of an electronic circuit (7) for making the legrest (4) pivot between the two positions defined above and simultaneously controlling the mergence or progressive retraction of the footrest according to predetermined kinematics. The said electronic circuit (7) also cooperates with means (11) able to be actuated by the user in order to adjust the position of the legrest.

10 Claims, 2 Drawing Sheets

AIRCRAFT SEAT WITH ADJUSTABLE LEGREST AND FOOTREST

The invention relates to an aircraft seat comprising control means for simultaneously controlling the movement of the legrest and footrest.

BACKGROUND OF THE INVENTION

Aircraft seats are already known in which the legrest and footrest are controlled simultaneously.

The applicant has been selling since 1990, under the name "Goldwing", a seat comprising control means for making the legrest pivot between two positions defined above and simultaneously controlling the progressive emergence of the footrest according to a predetermined kinematics so that the footrest does not touch the floor.

In this seat, an electric motor is disposed between the squab and the legrest, able to control the movement of the latter. The legrest and footrest are connected by a mechanical link.

The electric motor controls the pivoting of the legrest fixed in an articulated fashion to the seat squab between a substantially vertical position and a position situated substantially in line with the squab.

The mechanical link between the legrest and the footrest is such that, when the legrest pivots, the footrest moves between a retracted position and an extension position situated in line with the legrest; the progressive emergence of the footrest occurring according to a kinematics predetermined so that the footrest does not touch the floor.

This device does however have the drawback of not making it possible to adjust the length of extension of the footrest independently of the position of the legrest. The result is a situation of discomfort for the user, who cannot adjust the footrest to his size.

The U.S. Pat. No. 5,352,020 describes an aircraft seat having a legrest and a footrest controlled independently of each other.

However, the control device described in this document does not prevent the footrest from touching the floor. Only wheels are provided for preventing the footrest suffering damage.

The U.S. Pat. No. 5,887,949 and EP 774 913 describe a seat having a legrest and a footrest, the extension of the footrest being adjustable independently of the legrest. Means of controlling the legrest and footrest prevent the footrest from touching the floor.

To this end, the U.S. Pat. No. 5,887,949 and EP 774 913 describe a seat having two electric motors for controlling the legrest and footrest.

Sensors are associated with these motors and are connected to a central unit which determines, from data from sensors, the instantaneous positions of the legrest and of the footrest.

According to the positions determined, the central unit controls the movement of the legrest or of the footrest or refuses this where there is a risk that the footrest may touch the floor.

However, this device has the drawback of requiring many sensors and a complex system of controlling the position of the footrest.

The purpose of the invention is to produce an aircraft seat which does not have the drawbacks of existing seats.

SUMMARY OF THE INVENTION

To this end, the invention relates to a seat, notably for an aircraft, comprising:
a squab,
a backrest fixed in an articulated fashion to the structure of the seat so as to be able to adjust its inclination,
a legrest fixed in an articulated fashion to the structure of the seat so as to be able to adjust its inclination between a substantially vertical position and a position situated substantially in line with the squab,
a footrest carried by the said legrest, able to move between a retracted position and an extension position situated in line with the legrest,
control means for making the legrest pivot between the two positions defined above and simultaneously controlling the progressive emergence of the footrest according to a predetermined kinematics so that the legrest does not touch the floor.

The seat according to the invention is characterised in that the said control means consist of an electronic circuit cooperating with actuators in order to make the legrest pivot and simultaneously provide the progressive emergence or retraction of the footrest, the said electronic circuit also cooperating with means able to be actuated by the user in order to adjust the position of the footrest between a maximum extension position corresponding to the said predetermined kinematics of emergence of the footrest and the completely retracted position.

Just like the previous seat of the applicant described above, the seat according to the invention therefore has a legrest and a footrest whose kinematics is predetermined.

On the other hand, it has the advantage of allowing the adjustment of the footrest independently of the legrest.

The device described in the invention also has the following advantages:
the problem of the footrest touching the floor does not arise, the imposed kinematics avoiding the floor,
it does not require the instantaneous determination of the positions of the legrest and of the footrest to prevent the latter touching the floor.

In a variant, the said electronic circuit cooperates with the said means able to be actuated by the user in order to adjust the position of the footrest independently of the legrest when the said legrest is immobile.

The seat can also comprise the following characteristics, alone or in combination.

The electronic circuit comprises a central unit for managing the kinematics of the legrest and of the footrest.

The said control means include a control box comprising at least one button for controlling the pivoting of the legrest and at least one button for controlling the adjustment of the extension of the footrest.

These buttons permit one or other or both of the controls described above.

The said button for controlling the adjustment of the extension of the footrest simultaneously controls the pivoting of the legrest when the latter is in the said substantially vertical position, according to the said determined kinematics.

The said button for controlling the pivoting of the legrest between a position close to the said position situated substantially in line with the squab and a position close to the said substantially vertical position, simultaneously controls the retraction or the emergence of the footrest, the latter being situated in any position between its maximum extension position and its totally retracted position.

The seat according to the invention comprises a first motor for controlling the movement of the legrest placed between the squab and the legrest and a second motor for controlling the movement of the footrest placed between the legrest and the footrest.

BRIEF DESCRIPTION OF THE DRAWINGS

Other particularities and advantages of the invention will also emerge from the following description.

In the accompanying drawings given by way of non-limitative examples.

DETAILED DESCRIPTION OF THE DRAWINGS

Figure 1:
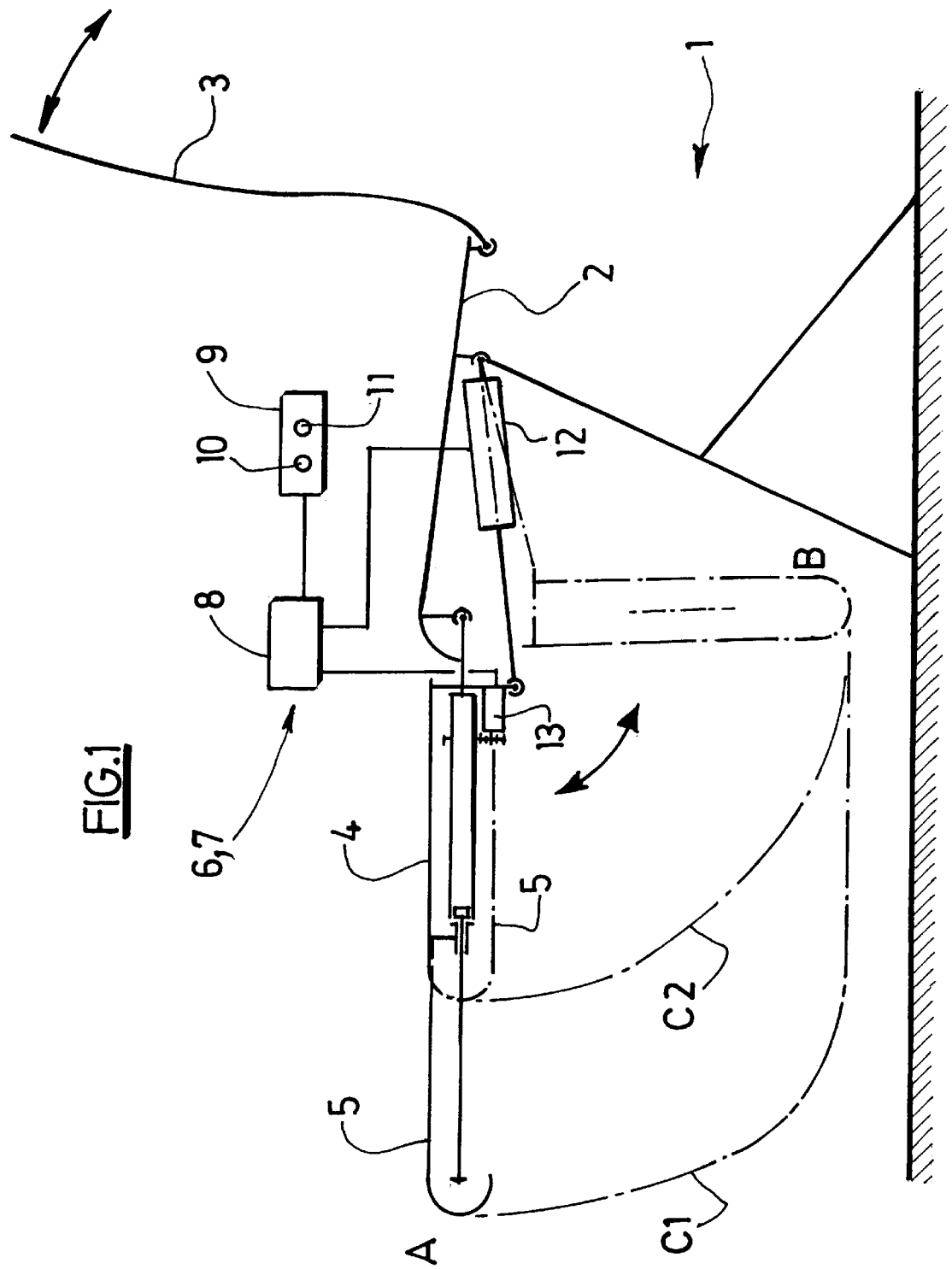
FIG. 1 is a functional diagram of the seat according to the invention.

In FIG. 1 a seat 1 is depicted, notably for an aircraft, comprising:

a squab 2, a backrest 3 fixed in an articulated fashion to the structure of the seat so as to be able to adjust its inclination, a legrest 4 fixed in an articulated fashion to the structure of the seat so as to be able to adjust its inclination, a movable footrest 5 carried by the legrest 4.

The inclination of the legrest 4 can be adjusted between a substantially vertical position A depicted in broken lines in FIG. 1 and a position B situated substantially in line with the squab 2, depicted in continuous lines in FIG. 1.

The footrest 5 is slidably mounted in the legrest 4. It is able to move between a retracted position, when the legrest 4 is in position B defined above, and an extension position situated in line with the legrest 4, such as, for example, in position A of the legrest 4.

The said seat 1 comprises control means 6 for making the legrest 4 pivot between the two positions A and B defined above and simultaneously controlling the emergence or progressive retraction of the footrest 5 according to a predetermined kinematics so that the footrest does not touch the floor.

The said control means 6 consist notably of an electronic circuit 7.

The electronic circuit 7 comprises a central unit 8 for managing the kinematics of the legrest 4 and of the footrest 5.

The central unit comprises one or more microprocessors which control the actuators and manage this kinematics in a manner known to experts.

The functioning of the central unit is therefore not described in any further detail.

The said control means 6 also include a control box 9 comprising at least one button 10 for controlling the pivoting of the legrest 4 and at least one button 11 for controlling the adjustment of the extension of the footrest 5.

The seat comprises a first motor 12 for controlling the movement of the legrest 4. This motor is placed between the squab 2 and the legrest 4.

A second motor 13, placed between the legrest 4 and the footrest 5, controls the movement of the footrest 5 with respect to the legrest 4.

The motors 12, 13 are connected to the central unit 8 by means of an electrical circuit. Another electrical circuit connects the central unit 8 to the buttons 10, 11 on the control box.

The electronic circuit 7 cooperates with actuators such as the motors 12 and 13 in order to make the legrest 4 pivot and simultaneously provide the emergence or progressive retraction of the footrest 5.

Moreover, the said electronic circuit 7 cooperates with means, such as the motor 13, able to be actuated by the user, for example by means of the button 11, for adjusting the position of the footrest between a maximum extension position corresponding to the said predetermined emergence kinematics of the footrest and the completely retracted position.

In one embodiment, the said electronic circuit 7 cooperates with the said means able to be actuated by the user in order to adjust the position of the footrest independently of the legrest when the said legrest is immobile.

The functioning of the seat 1, and more precisely of the legrest 4 and of the footrest 5, is now described in detail with reference to FIG. 2.

The movement of the legrest 4 and footrest 5 is first of all described during their passage from the substantially vertical position B to the substantially horizontal position A.

When the user actuates the button 10 controlling the legrest 4, the latter pivots towards position B and simultaneously the footrest 5 extends so as to follow a given kinematic curve C1 identical to that followed by the same components in the "Goldwing" seat.

Figure 2:
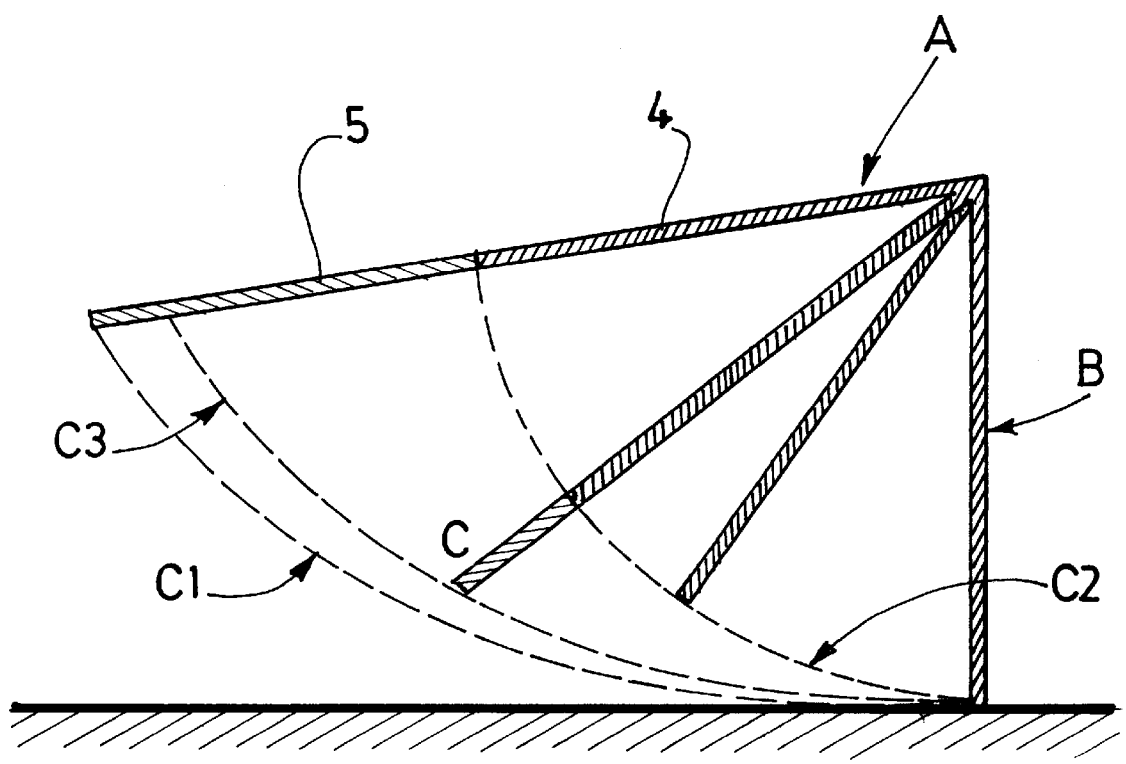
FIG. 2 depicts schematically several possible paths followed by the legrest and the footrest.

This given kinematic curve C1 is depicted in FIG. 2. It corresponds to the curve of maximum extension of the footrest 5.

The movement of the legrest 4 and of the footrest 5 stops when the legrest 4 has reached position A, or when the user ceases to actuate the button 10.

When the legrest is in a position in which the footrest 5 is completely retracted, if the user actuates the button 11, which controls the adjustment of the extension of the footrest 5, then the button 11 simultaneously controls the pivoting of the legrest 4 and the emergence of the footrest 5, so that the legrest and footrest follow the curve C1.

As from the time when the legrest 4 is in a position in which the footrest 5 is out, the button 11 controls the adjustment of the emergence of the footrest 5 between a retracted position, represented by the curve C2 in FIG. 2, and the maximum emerged position, represented by the curve C1, independently of the legrest 4.

When the legrest 4 and the footrest 5 are in an intermediate position C depicted in FIG. 2, then the actuation of the button 2 simultaneously controls the legrest and the footrest according to a curve C3 intermediate between the limit curves C1 and C2.

In a similar fashion, when the legrest 4 is in the substantially horizontal position A, actuation of the button 10 simultaneously controls the legrest and the footrest according to the curve C1 or C2 or according to one of the intermediate curves lying between these two curves.

In another embodiment, the passage from position B to position A, or from an intermediate position C to position A, takes place solely according to curve C1 by actuating the button 10.

The intermediate curves C3 between the two curves C1 and C2 are then followed only when the legrest 4 passes from position A (or from an intermediate position C) to position B, always by actuating the button 10.

Naturally, the invention is not limited to the embodiment which has just been described.

The control buttons 10, 11 can for example be replaced by one or more buttons or levers.

The use of sensors associated with the motors 12, 13 as safety means for controlling the movement of the legrest 4 and of the footrest 5 can also be provided for.

What is claimed is:

1. A seat, notably for an aircraft, comprising:

a squab;

a backrest fixed in an articulated fashion to the seat so as to be able to adjust the inclination of the backrest;

a legrest fixed in an articulated fashion to the seat so as to be able to adjust the inclination of the legrest between a substantially vertical position and a position situated substantially in line with the squab;

a footrest carried by the legrest, able to move between a retracted position and an extended position situated in line with the legrest;

actuators able to adjust the inclination of the legrest between the vertical position and the position in line with the squab to initiate the extension or retraction of the footrest with respect to the legrest;

user actuated means comprising first and second buttons for controlling the pivoting of the legrest and the extension or retraction of the footrest;

control means able to synchronize the pivoting of the legrest and the extension or retraction of the footrest according to first pre-determined kinematics in which a predetermined extended position of the footrest corresponds to an inclination of the legrest;

said control means cooperating with said first button for pivoting the legrest and extending or retracting the footrest according to said first pre-determined kinematics;

said control means cooperating with said second button to permit, in a given position of the legrest, adjustment of the position of the footrest between its extended position corresponding to said given position of the legrest and its retracted position;

said control means further cooperating with said second button to permit, when the footrest is in a position corresponding to said first pre-determined kinematics and said second button is actuated for further extension of the footrest, extension of the footrest and pivoting of the legrest according to said first pre-determined kinematics; and said control means further cooperating with said first button, when the footrest is in a position not corresponding to said first pre-determined kinematics, for pivoting the legrest and extending or retracting the footrest according to a second pre-determined kinematics.

2. A seat according to claim 1, wherein the control means cooperates with the user actuated means in order to adjust the position of the footrest independently of the legrest when the legrest is immobile.

3. A seat according to claim 2, wherein the control means comprises a central unit for managing the kinematics of the legrest and the footrest.

4. A seat according to claim 2, further comprising a first motor for controlling the movement of the legrest placed between the squab and the legrest, and a second motor for controlling the movement of the footrest placed between the legrest and the footrest.

5. A seat according to claim 3, further comprising it comprises a first motor for controlling the movement of the legrest placed between the squab and the legrest, and a second motor for controlling the movement of the footrest placed between the legrest and the footrest.

6. A seat according to claim 1, wherein the control means comprises an electronic circuit including a central unit for managing the kinematics of the legrest and the footrest.

7. A seat according to claim 6, further comprising a first motor for controlling the movement of the legrest placed between the squab and the legrest, and a second motor for controlling the movement of the footrest placed between the legrest and the footrest.

8. A seat according to claim 1, further comprising a first motor for controlling the movement of the legrest placed between the squab and the legrest, and a second motor for controlling the movement of the footrest placed between the legrest and the footrest.

9. A seat according to claim 1, wherein:

said second predetermined kinematics is identical to said first pre-determined.

10. A seat according to claim 1, wherein:

said second predetermined kinematics is different from said first predetermined kinematics.

* * * * *